United States Patent
Kohl et al.

[15] 3,692,287
[45] Sept. 19, 1972

[54] METHOD AND APPARATUS FOR REMOVING ALKALI FROM CEMENT SYSTEM

[72] Inventors: Robert F. Kohl, Shorewood; Glenn A. Heian, Franklin, both of Wis.

[73] Assignee: Allis-Chalmers Manufacturing Company, Milwaukee, Wis.

[22] Filed: Dec. 10, 1970

[21] Appl. No.: 96,776

[52] U.S. Cl. .............................263/32 R, 263/53 R
[51] Int. Cl..................................................F27b 7/20
[58] Field of Search...................................263/32, 53

[56] References Cited

UNITED STATES PATENTS

| | | |
|---|---|---|
| 3,507,482 | 4/1970 | Kraszewski et al.......263/32 R |
| 2,883,173 | 4/1959 | Laboulais.................263/32 R |

*Primary Examiner*—John J. Camby
*Attorney*—Arthur M. Streich, Robert B. Benson and John P. Hines

[57] ABSTRACT

A method and apparatus is disclosed for reducing the alkali content of cement clinker in which dust and volatilized alkalies are removed from hot clinkering kiln exit gases utilized to preheat particulate raw material. A stream of kiln exit gases at 1,800° F., with entrained dust and volatilized alkalies, are collected by a hood that turns the stream upwardly countercurrent to the falling feed material. A portion of the upwardly moving stream is bypassed upwardly and away from the falling feed material and into a mixing box as close to the hood as is permitted by surrounding structures. Air is admitted to the mixing box and mixed with the bypassed portion of the stream to chill the mixture to below 600° F., to freeze the alkalies. This sudden chilling of the bypassed gas stream freezes the alkalies to particles, most smaller than 10 to 20 microns. The chilled gas stream is then passed through a cyclone separator to collect dust particles larger than 10 to 20 microns and a minor portion of the frozen alkalies. The gas stream is then passed through an electrostatic precipitator or a plurality of gas permeable bags to collect dust particles smaller than 10 to 20 microns and a major portion of the frozen alkalies. The bypassed portion of the gas stream from the hood to the mixing box passes through a conduit that tapers toward the mixing box, and the stream from the mixing box to the cyclone separator passes through a conduit that tapers away from the mixing box, to provide an increase in velocity of the gas to maintain the dust and frozen alkalies suspended in the gas. A ported cage is mounted within the mixing box to create turbulence and efficient mixing of the air and gas.

9 Claims, 2 Drawing Figures

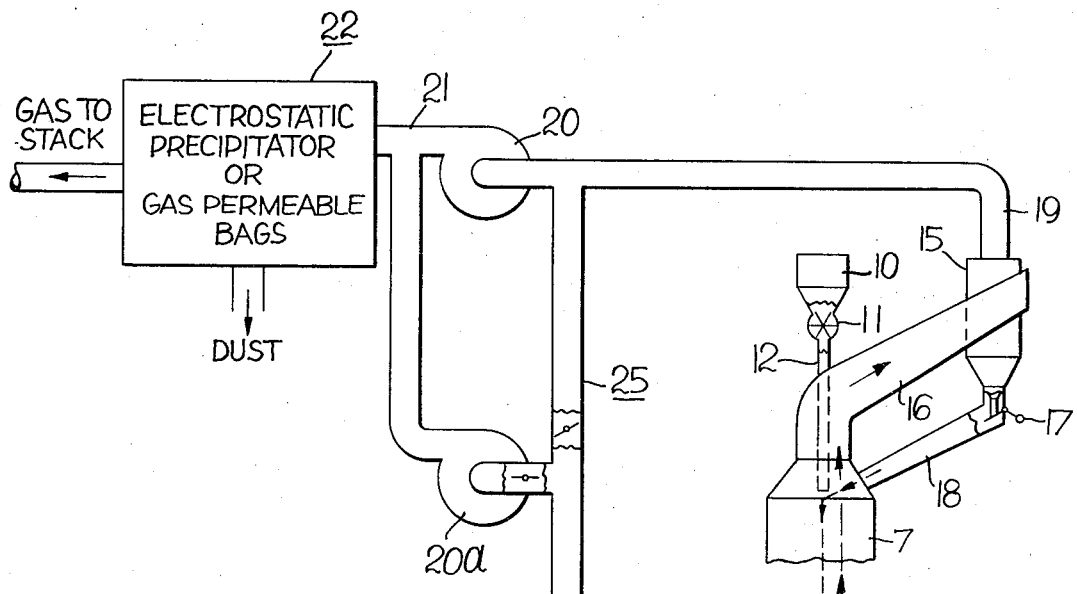
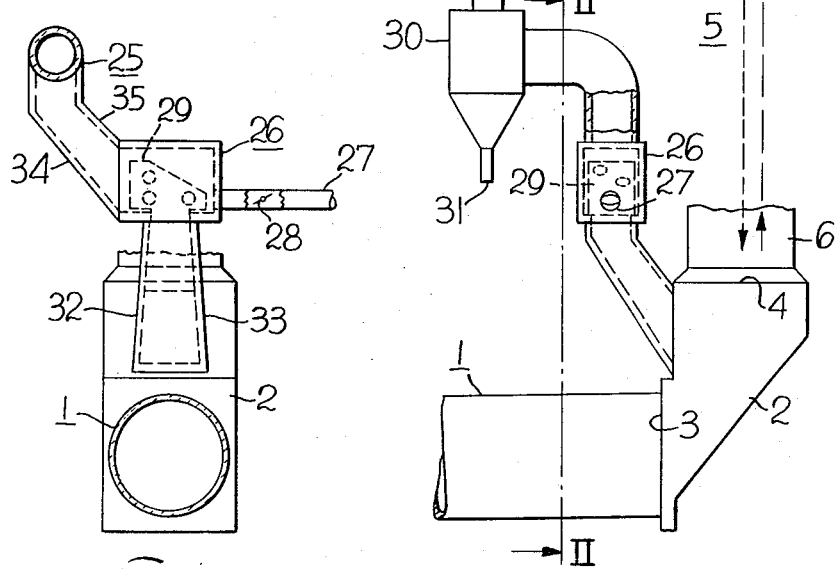
Fig. 1
Fig. 2

METHOD AND APPARATUS FOR REMOVING ALKALI FROM CEMENT SYSTEM

CROSS REFERENCE TO RELATED PATENT APPLICATION

This application discloses a gas and air mixing box which is also part of a system the subject of a copending United States patent application of Glenn A. Heian entitled "Method and Furnace for Heat Treating Materials," Ser. No. 96,775, filed concurrently with this application on Dec. 10, 1970 and now U.S. Pat. No. 3,653,645 dated Apr. 4, 1972.

BACKGROUND OF THE INVENTION

1. Field of the Invention

This invention relates to methods and apparatus for preheating particulate feed material for a rotary kiln with heat exit gases from the kiln and in particular to the production of cement, from raw materials containing alkalies, chlorides or the like.

2. Description of the Prior Art

Preheaters for rotary kilns known to the prior art and that involve preheating finely divided raw material suspended in and moving generally counter to the flow of heated kiln exit gases, may perhaps be conveniently considered as being of two general types. A type I involves one or more cyclone dust separators. A type II comprises or includes a vertical tower. U.S. Pat. No. 3,441,258 of 1969 relates to such a type II preheater, but in a description of prior art contained in that patent, a great many patents are identified disclosing the type I preheater as well as patents disclosing the type II preheater. As will appear from the description to follow, the present invention may be applied to either of the foregoing types of suspended particle preheaters, and a few of such prior art patents will be hereinafter discussed to an extent that provides a convenient basis for explaining problems to which the present invention is directed.

U.S. Pat. Nos. 1,315,254 of 1919 and 1,909,820 of 1933 both disclose rotary kilns having a hood surrounding the material inlet and gas outlet end of a kiln, with a provision for admitting cold atmospheric air to mix with and cool dust laden kiln discharge gases. With those systems dust returned to the kiln was undesirably high in alkali content and caused the alkali concentration in the kiln and finished cement to be increased.

In an effort to unload suspended particle preheating systems of unwanted alkali and reduce the alkali content of cement made from alkali containing raw material, bypass conduits have been arranged over the gas discharge end of rotary kilns to catch and bypass directly to atmosphere a portion of the dust and alkali laden gases from the kiln. A German publication, Zement-Kalk-Gips, Nr 12/1965 pages 626–629, shows in Figures numbered 3, 5, 6, 8 and 10, that well known cement making systems have been provided with such bypasses and a stack to atmosphere. Although such bypass arrangements unload alkali from the systems, the alkali becomes sticky as the alkali is condensed to a mist and an undesired buildup of alkali is formed on the inner surfaces of the conduit and stack.

Another arrangement has been disclosed in U.S. Pat. No. 3,212,764 of 1965, for the removal of alkalies from the flue gases. In that arrangement a portion or all of the flue gases, before entering the preheater, are drawn into a conduit into which cold fine grained solid material is introduced and contacted with the flue gases for precipitating the entrained alkalies. This fine grained material, together with precipitated alkali, is then removed from the system. However, owing to the high percentage of kiln dust and injected material involved, the alkali concentration in the extracted material is very low and further processing of this material with a view to its further utilization as such as agricultural fertilizer is economically not worthwhile. Further, the problem of the alkali coating on the inner surface of the bypass conduit has not been satisfactorily solved. A British Pat. No. 982,719 shows a similar arrangement, but with a cyclone separator between the kiln and the location at which cold material is injected to cause alkali to precipitate, to remove some dust before the alkali precipitates. This system likewise does not provide a satisfactory solution to the problem of alkali coating inner conduit surfaces.

A later arrangement for removing alkali from flue gases is disclosed in U.S. Pat. No. 3,313,534 of 1967. In that arrangement volatilized alkalies are caused to precipitate by chilling with cold air. That arrangement provided for efficient alkali removal but like the other arrangements did not provide a satisfactory solution to the problem of alkali deposits on the inner surfaces of a bypass conduit.

SUMMARY OF THE INVENTION

It is an object of the present invention to provide a new and improved method for reducing the alkali content of cement clinker in which dust and volatilized alkalies are removed from ascending hot clinkering kiln exit gases utilized to preheat particulate raw material falling through the ascending gases. To achieve this objective according to a preferred embodiment of the present invention, kiln exit gases with entrained dust and volatilized alkalies are collected from the kiln by a hood that receives the gas as a generally horizontal moving stream and turns the stream upwardly countercurrent to the falling feed material. A portion of the upwardly moving stream is bypassed upwardly and away from the falling feed material and into a mixing box as close to the hood as is permitted by surrounding structures. Air is admitted to the mixing box and mixed with the bypassed portion of the stream, with the air input being sufficient to chill the mixture to perhaps below 600° F, to freeze the alkalies. This sudden chilling of the bypassed gas stream freezes the alkalies to very small particles, most of which are smaller than 10 to 20 microns. The chilled gas stream is then passed through a cyclone separator to collect dust particles larger than 10 to 20 microns and a minor portion of the frozen alkalies. The gas stream is then passed through an electrostatic precipitator or a plurality of gas permeable bags to collect dust particles smaller than 10 to 20 microns and a major portion of the frozen alkalies.

According to another feature of the present invention the bypassed portion of the gas stream from the hood to the mixing box passes through a conduit that tapers toward the mixing box, and the stream from the mixing box to the cyclone separator passes through a conduit that tapers away from the mixing box, to provide an increase in velocity of the gas to maintain the dust and frozen alkalies suspended in the gas.

According to still another feature of the present invention, a ported cage, preferably made of stainless steel, is mounted within the mixing box to create turbulence and efficient mixing of the air and gas.

Other features and objects of the invention that have been attained will appear from the more detailed description to follow with reference to an embodiment of the present invention shown in the accompanying drawing.

BRIEF DESCRIPTION OF THE DRAWING

FIG. 1 of the accompanying drawing shows diagrammatically a side elevation, partly in section, a rotary kiln feed material preheater according to the present invention; and FIG. 2 is a view taken along line II—II in FIG. 1 and viewing the structure in the direction indicated by arrows.

DESCRIPTION OF THE PREFERRED EMBODIMENT

A rotary kiln 1 is provided with a hood 2 having an inlet opening 3 in a vertical plane around the end of the kiln 1. The hood 2 has a gas discharge opening 4. A particle suspension type preheater 5 is provided with a bottom portion 6 connected to the opening 4 of hood 2, and a top portion 7 vertically spaced above the bottom portion 6 by intermediate structure (not shown). Intermediate structure (not shown) between preheater portions 6 and 7 may be a cylindrical tower as shown in U.S. Pat. No. 3,441,258 or a plurality of cyclone separators as shown in U.S. Pat. No. 2,663,560, or a combination of a tower and cyclone separators as shown in U.S. Pat. No. 3,083,472 and U.S. Pat. No. 3,288,450.

A feed hopper 10, having a discharge opening fitted with a rotary feeder 11, is connected to the top portion 7 of the preheater by a conduit 12. A cyclone dust collector 15 is connected to the top portion 7 by a conduit 16. Dust collector 15 has a material discharge opening fitted with an air lock 17 and is connected by a conduit 18 to the top portion 7. The dust collector 15 is connected to a gas discharge conduit 19 which is in turn connected to a gas inlet of an induced draft fan 20. A conduit 21 connects fan 20 to a fine dust collector 22, which as indicated on the drawing may be an electrostatic precipitator (as shown in U.S. Pat. No. 3,288,450) or gas permeable bags (as shown in FIG. 3 of U.S. Pat. No. 3,110,483).

A bypass conduit means 25 lined with refractory material, is connected on one end to the hood 2 at a location adjacent to and above the gas inlet opening 3 but below the gas discharge opening 4, and on another end to the conduit 19 upstream of the induced draft fan 20. A mixing box 26 is mounted in the bypass conduit means 25 as close to hood 2 as is permitted by surround structures (not shown). An atmospheric air admitting means 27 is connected to the mixing box 26 for admitting cold air into the box 26. A damper 28, shown in FIG. 2, is provided in the air admitting means 27 for controlling air flow into box 26. A ported cage 29, preferably made of stainless steel or other heat resistant material, is mounted within the mixing box 26 to create turbulence and efficient mixing of the air from the admitting means 27 and gas drawn off through the bypass conduit means 25 from hood 2. A cyclone separator 30, shown in FIG. 1, and having a particle discharge opening 31 is connected to the bypass conduit means 25 downstream of the mixing box 26 and upstream of fan 20. Referring to FIG. 2, the bypass conduit means 25 is provided with walls 32, 33 which converge to provide a tapered passage from hood 2 to mixing box 26, and walls 34, 35 which converge to provide a tapered passage away from mixing box 26, to provide an increase in velocity of gas passing therethrough to maintain dust and precipitated unwanted mineral constituents suspended in the gases.

In the operation of the present invention to produce Portland cement low in alkalies from alkali containing raw materials, raw materials from hopper 10 are discharged through feeder 11 and conduit 12 into the top portion 7 of the preheater 5. As the material drops downwardly through preheater 5 hot gases from kiln 1 preheat the material and the material, partially calcined, passes through hood 2 into kiln 1 where the material is burned to cement clinker. As the material is burned in kiln 1, alkalies are volatilized and along with dust are drawn out of kiln 1 by fan 20 or a separate fan 20a, at a temperature of at least 1,800° F, and pass into hood 2 as a generally horizontal moving stream. The hood 2 turns the stream upwardly countercurrent to the falling feed material. A portion of the upwardly moving stream is bypassed upwardly and away from the falling feed material through bypass means 25 and into mixing box 26. The bypassed portion of the stream is a portion which constituted the upper strata of the stream before the stream is turned upwardly by hood 2. Air is admitted to the mixing box 26 and mixed with the bypassed portion of the stream, with the air input being sufficient to lower the temperature of the mixture from approximately 1,800° F. to below the freezing temperature of the alkalies, which for NaOH and KOH would be below 600° F. This sudden chilling of the bypassed gas stream freezes the alkalies to very small particles and particles of low density, most of which are smaller than 10 to 20 microns. The chilled gas stream is then passed through cyclone separator 30 to collect dust particles larger than 10 to 20 microns and a minor portion of the frozen alkalies. The gas stream is then passed through dust collector 22, which is either an electrostatic precipitator or a plurality of gas permeable bags, to collect dust particles smaller than 10 to 20 microns and a major portion of the frozen alkalies. The particles collected in cyclone separator 30 will contain only a mall amount of the alkali and therefore may, if desired, be recirculated through the system. Dust collected by the collector 22 will contain a greater percent alkalies and may be used for other purposes such as agricultural fertilizer.

From the foregoing detailed description of the present invention it has been shown how the objects of the present invention have been attained in a preferred manner. However, modification and equivalents of the disclosed concepts such as readily occur to those skilled in the art are intended to be included in the scope of this invention. Thus, the scope of the invention is intended to be limited only by the scope of the claims such as are or may hereafter be, appended hereto.

The embodiments of the invention in which an exclusive property or privilege is claimed are defined as follows:

1. A method for reducing the alkali content of cement clinker in which unwanted volatilized alkalies are removed from ascending hot clinkering kiln exit gases utilized to preheat particulate raw material, the steps comprising:

a. collecting the gases, dust and volatilized alkalies as a generally horizontal moving stream and turning the stream to pass upwardly countercurrent to the falling feed material;

b. bypassing a portion of the upwardly moving stream to pass upwardly and away from the falling feed material, said bypassed portion of the stream being a portion which constituted the upper strata of the stream before the stream is turned to pass upwardly;

c. admitting and mixing air at atmospheric temperature with the bypassed portion of the stream in sufficient quantity to freeze the volatilized alkalies to particles smaller than 10 to 20 microns; and d. separating and removing from the bypassed portion of the stream the dust and frozen alkalies by first collecting dust particles larger than 10 to 20 microns from the bypassed stream and then collecting particles smaller than 10 to 20 microns which contain a major portion of the frozen alkalies.

2. In a method according to claim 1, the gases, dust and volatilized alkalies at about 1,800° F. are collected and air is admitted and mixed with the bypassed portion of the stream with the air input being sufficient to lower the temperature of the mixture to below 600° F.

3. An apparatus for preheating particulate material for a rotary kiln with hot exit gases from the kiln containing dust and unwanted volatilized mineral constituents, having a hood with a gas inlet opening in a vertical plane for receiving kiln gases and a gas discharge opening above the gas inlet opening for discharging kiln gases upwardly through material preheating means through which particulate material drops and is preheated, the improvement comprising:

a. a bypass conduit means connected to the hood at a location adjacent to and above the gas inlet opening but below the gas discharge opening;

b. a mixing box in the bypass conduit means in proximity to the hood;

c. an atmospheric air admitting means connected to the mixing box for admitting air at atmospheric temperature to mix with hot gas in the box and precipitate unwanted volatilized mineral constituents in the hot gas; and d. separating means connected to the bypass conduit means downstream of the mixing box for separating dust and precipitated unwanted mineral constituents from the gas.

4. In an apparatus according to claim 3 the separating means comprising a centrifugal separator.

5. In an apparatus according to claim 3 the separating means comprising a cyclone separator for removing from the gas stream dust particles 10 to 20 microns and larger and a minor proportion of the precipitated unwanted mineral constituents, and a fine particle separator downstream of the centrifugal separator for removing from the gas stream particles smaller than 10 to 20 microns and a major proportion of the precipitated unwanted mineral constituents.

6. In an apparatus according to claim 5, the fine particle separator being an electrostatic particle precipitator.

7. In an apparatus according to claim 5, the fine particle separator comprising a plurality of gas permeable filtering bags.

8. In an apparatus according to claim 3, at least a portion of the bypass conduit means between the hood and the mixing box being tapered toward the mixing box and at least a portion of the bypass conduit means between the mixing box and the separating means being tapered away from the mixing box, to provide an increase in velocity of gas passing therethrough to maintain the dust and precipitated unwanted mineral constituents suspended in the gas.

9. In an apparatus according to claim 3, a ported cage of heat resistant material mounted within the mixing box for creating turbulence of the air and gas and promote mixing thereof.

* * * * *